United States Patent
Dong (10) Patent No.: US 9,955,517 B2
(45) Date of Patent: Apr. 24, 2018

(54) METHOD FOR ESTABLISHING WIRELESS COMMUNICATION CONNECTION AND TERMINAL DEVICE

(71) Applicant: Huawei Technologies Co., Ltd., Shenzhen (CN)

(72) Inventor: Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/399,861

(22) Filed: Jan. 6, 2017

(65) Prior Publication Data

US 2017/0118785 A1  Apr. 27, 2017

Related U.S. Application Data

(63) Continuation of application No. PCT/CN2015/089257, filed on Sep. 9, 2015.

(30) Foreign Application Priority Data

Sep. 10, 2014  (CN) .......................... 2014 1 0460476

(51) Int. Cl.
*H04W 76/02* (2009.01)
*H04W 8/00* (2009.01)
(Continued)

(52) U.S. Cl.
CPC .......... *H04W 76/023* (2013.01); *G01S 11/14* (2013.01); *H04W 8/005* (2013.01); *H04W 4/02* (2013.01)

(58) Field of Classification Search
CPC . H04W 76/02; H04W 76/023; H04W 76/043; H04W 4/02; H04W 8/005
See application file for complete search history.

(56) References Cited

U.S. PATENT DOCUMENTS 7,529,542 B1 *  5/2009  Chevion ................. H04W 4/02
                                                     455/411
8,447,070 B1 *  5/2013  Bozarth .................. H04N 7/18
                                                     382/103
(Continued)

FOREIGN PATENT DOCUMENTS

CN  102624428 A  8/2012
CN  103116410 A  5/2013
(Continued)

OTHER PUBLICATIONS

Foreign Communication From a Counterpart Application, European Application No. 15839187.0, Extended European Search Report dated Jun. 16, 2017, 9 pages.
(Continued)

*Primary Examiner* — Duc M Nguyen
(74) *Attorney, Agent, or Firm* — Conley Rose, P.C.

(57) ABSTRACT

A method for establishing a wireless communication connection, including: obtaining direction information entered by a user; sending an ultrasonic signal in a direction indicated by the direction information, so that a target terminal device located within a transmission range of the ultrasonic signal receives the ultrasonic signal; receiving a target response signal returned by the target terminal device for the ultrasonic signal; and establishing a wireless communication connection to the target terminal device according to the target response signal.

18 Claims, 6 Drawing Sheets

(51) Int. Cl.
*G01S 11/14* (2006.01)
*H04W 4/02* (2018.01)

(56) References Cited

U.S. PATENT DOCUMENTS

| | | | | |
|---|---|---|---|---|
| 8,451,344 | B1* | 5/2013 | Karakotsios | H04N 5/772 348/211.11 |
| 9,014,760 | B2 | 4/2015 | Song et al. | |
| 2006/0161379 | A1* | 7/2006 | Ellenby | G01C 21/20 702/150 |
| 2006/0259574 | A1* | 11/2006 | Rosenberg | H04L 67/04 709/217 |
| 2007/0273583 | A1* | 11/2007 | Rosenberg | H04W 8/005 342/367 |
| 2008/0051033 | A1* | 2/2008 | Hymes | G06F 17/30247 455/47 |
| 2009/0140986 | A1 | 6/2009 | Karkkainen et al. | |
| 2009/0265470 | A1 | 10/2009 | Shen et al. | |
| 2010/0278345 | A1 | 11/2010 | Alsina et al. | |
| 2011/0105904 | A1* | 5/2011 | Watanabe | A61B 8/00 600/443 |
| 2014/0035526 | A1* | 2/2014 | Tripathi | B60L 11/1838 320/109 |
| 2014/0145988 | A1* | 5/2014 | Ishizawa | H04L 67/06 345/173 |
| 2015/0042168 | A1* | 2/2015 | Widmer | B60L 11/1829 307/104 |
| 2015/0126118 | A1* | 5/2015 | Lin | H04W 76/023 455/41.2 |
| 2016/0014722 | A1* | 1/2016 | Yoon | H04W 72/02 455/426.1 |

FOREIGN PATENT DOCUMENTS

| | | |
|---|---|---|
| CN | 103365597 A | 10/2013 |
| CN | 103825661 A | 5/2014 |

OTHER PUBLICATIONS

Machine Translation and Abstract of Chinese Publication No. CN102624428, Aug. 1, 2012, 7 pages.
Machine Translation and Abstract of Chinese Publication No. CN103365597, Oct. 23, 2013, 11 pages.
Foreign Communication From a Counterpart Application, PCT Application No. PCT/CN2015/089257, English Translation of International Search Report dated Nov. 25, 2015, 2 pages.
Foreign Communication From a Counterpart Application, PCT Application No. PCT/CN2015/089257, English Translation of Written Opinion dated Nov. 25, 2015, 5 pages.

* cited by examiner

METHOD FOR ESTABLISHING WIRELESS COMMUNICATION CONNECTION AND TERMINAL DEVICE

CROSS-REFERENCE TO RELATED APPLICATIONS

This application is a continuation application of international patent application number PCT/CN2015/089257 filed on Sep. 9, 2015, which claims priority to Chinese patent application number 201410460476.3 filed on Sep. 10, 2014, which are incorporated by reference.

TECHNICAL FIELD

The present disclosure relates to the field of wireless communications technologies, and in particular, to a method for establishing a wireless communication connection and a terminal device.

BACKGROUND

In some approaches, to establish a wireless communication connection to a terminal device B in a specific direction, a terminal device A needs to first obtain identity information of the terminal device B. The identity information is used to identify the terminal device B, and specifically, the identity information includes number information, cell identity information, mobile switching center identity information, location area identity information, and the like that are of the terminal device B. The terminal device A sends a connection establishment request to the terminal device B according to the identity information, so as to establish a communication connection to the terminal device B. A disadvantage of this solution is that, to establish the communication connection to the terminal device B in the specific direction, the terminal device A needs to obtain the identity information of the terminal device B before sending the connection establishment request to the terminal device B, and then sends the connection establishment request to the terminal device B according to the identity information of the terminal device B. The disadvantage of this solution is that a party that initiates a communication connection establishment request needs to obtain identity information of a target terminal device before sending a connection establishment request.

SUMMARY

The present disclosure provides a method for establishing a wireless communication connection and a terminal device. A connection establishment request may be sent to a target terminal device as long as information about a direction of the target terminal device relative to a party sending a communication connection request is obtained. This improves efficiency of sending a connection establishment request by a communication connection establishment initiator.

According to a first aspect, the present disclosure provides a method for establishing a wireless communication connection, where the method includes: obtaining direction information entered by a user; sending an ultrasonic signal according to a direction indicated by the direction information, to enable a target terminal device located on a transmission path of the ultrasonic signal to receive the ultrasonic signal; receiving a target response signal returned by the target terminal device for the ultrasonic signal; and establishing a wireless communication connection to the target terminal device according to the target response signal.

With reference to the first aspect, in a first implementation manner of the first aspect, the receiving a target response signal returned by the target terminal device for the ultrasonic signal includes: receiving multiple response signals returned by multiple terminal devices for the ultrasonic signal, where the response signal carries distance information, and the distance information refers to information about a distance between a terminal device that returns the response signal and an ultrasonic signal transmit end; and identifying, from the multiple response signals and according to multiple pieces of distance information carried in the multiple response signals, the target response signal sent by the target terminal device.

With reference to the first aspect or the first implementation manner of the first aspect, in a second implementation manner of the first aspect, the sending an ultrasonic signal according to a direction indicated by the direction information includes: adjusting a transmission direction of the ultrasonic signal according to the direction indicated by the direction information, so as to transmit the ultrasonic signal along the direction indicated by the direction information.

With reference to the second implementation manner of the first aspect, in a third implementation manner of the first aspect, the adjusting a transmission direction of the ultrasonic signal according to the direction information, so as to transmit the ultrasonic signal along the direction indicated by the direction information includes: extending, by an angle of α, towards each of two sides of the direction by using the direction indicated by the direction information as a center, to form a transmission track of the ultrasonic signal.

With reference to any one of the first aspect, or the first implementation manner of the first aspect to the third implementation manner of the first aspect, in a fourth implementation manner of the first aspect, the target response signal includes device information of the target terminal device; and the establishing a wireless communication connection to the target terminal device according to the target response signal includes: sending a first connection establishment request to the target terminal device according to the device information; and receiving a first connection response returned by the target terminal device for the first connection establishment request, and establishing the wireless communication connection to the target terminal device according to the first connection response.

With reference to any one of the first aspect, or the first implementation manner of the first aspect to the third implementation manner of the first aspect, in a fifth implementation manner of the first aspect, the target response signal includes a second connection establishment request sent by the target terminal device to the ultrasonic signal transmit end; and the establishing a wireless communication connection to the target terminal device according to the target response signal includes: sending, for the second connection establishment request, a second connection response to the target terminal device, to establish the wireless communication connection to the target terminal device.

With reference to any one of the first aspect, or the first implementation manner of the first aspect to the fifth implementation manner of the first aspect, in a sixth implementation manner of the first aspect, the target response signal further includes information about a distance between the target terminal device and the ultrasonic signal transmit end, and the method further includes: determining, according to the distance information about a transmission when the ultrasonic signal is transmitted to the target terminal device, a type of the wireless communication connection established with the target terminal device; and the establishing a wireless communication connection to the target terminal device according to the target response signal includes: establishing the wireless communication connection to the target terminal device according to the target response signal and based on a protocol required by the type of the wireless communication connection.

According to a second aspect, the present disclosure further provides a terminal device, where the terminal device includes: an obtaining unit configured to obtain direction information entered by a user; a sending unit configured to send an ultrasonic signal in a direction indicated by the direction information, to enable a target terminal device located within a transmission range of the ultrasonic signal to receive the ultrasonic signal; a receiving unit configured to receive a target response signal returned by the target terminal device for the ultrasonic signal; and a connection establishment unit configured to establish a wireless communication connection to the target terminal device according to the target response signal.

With reference to the second aspect, in a first implementation manner of the second aspect, the terminal device further includes an identifying unit, where the receiving unit is further configured to receive multiple response signals returned by multiple terminal devices for the ultrasonic signal, where the response signal carries distance information, and the distance information refers to information about a distance between a terminal device that returns the response signal and an ultrasonic signal transmit end; and the identifying unit is configured to identify, from the multiple response signals and according to multiple pieces of distance information carried in the multiple response signals, the target response signal sent by the target terminal device.

With reference to the second aspect or the first implementation manner of the second aspect, in a second implementation manner of the second aspect, the sending unit is specifically configured to adjust a transmission direction of the ultrasonic signal according to the direction indicated by the direction information and transmit the ultrasonic signal in the direction indicated by the direction information.

With reference to the second aspect or the first implementation manner of the second aspect, in a third implementation manner of the second aspect, the sending unit is specifically configured to extend, by an angle of $\alpha$, towards each of two sides of the direction by using the direction indicated by the direction information as a center, to form a transmission track of the ultrasonic signal.

With reference to any one of the second aspect, or the first implementation manner of the second aspect to the third implementation manner of the second aspect, in a fourth implementation manner of the second aspect, the target response signal includes device information of the target terminal device; and the connection establishment unit is specifically configured to send a first connection establishment request to the target terminal device according to the device information, receive a first connection response returned by the target terminal device for the first connection establishment request, and establish the wireless communication connection to the target terminal device according to the first connection response.

With reference to any one of the second aspect, or the first implementation manner of the second aspect to the third implementation manner of the second aspect, in a fifth implementation manner of the second aspect, the target response signal includes a second connection establishment request sent by the target terminal device to the ultrasonic signal transmit end; and the connection establishment unit is specifically configured to send, for the second connection establishment request, a second connection response to the target terminal device, to establish the wireless communication connection to the target terminal device.

With reference to any one of the second aspect, or the first implementation manner of the second aspect to the fifth implementation manner of the second aspect, in a sixth implementation manner of the second aspect, the terminal device further includes a determining unit, where the target response signal further includes information about a distance between the target terminal device and the ultrasonic signal transmit end; the determining unit is configured to determine, according to the distance information about a transmission when the ultrasonic signal is transmitted to the target terminal device, a type of the wireless communication connection established with the target terminal device; and the connection establishment unit is specifically configured to establish the wireless communication connection to the target terminal device according to the target response signal and based on a protocol required by the type of the wireless communication connection.

According to the method for establishing a wireless communication connection in embodiments of the present disclosure, it may be known that direction information entered by a user is obtained, an ultrasonic signal is sent according to a direction indicated by the direction information, a target response signal returned by a target terminal device after receiving the ultrasonic signal is received, and a wireless communication connection to the target terminal device is established according to the response signal. That is, in the embodiments of the present disclosure, the ultrasonic signal may be sent to the target terminal device that is in the direction indicated by the direction information, as long as the direction information entered by the user is obtained. After the response signal returned by the target terminal device for the ultrasonic signal is received, the wireless communication connection may be established with the target terminal device. Therefore, in the technical solutions provided in the embodiments of the present disclosure, to send an ultrasonic signal to a target terminal device, a party that initiates communication connection establishment does not need to obtain a device identity of the target terminal device, and only needs to obtain information about a direction of the target terminal device relative to the party that initiates communication connection establishment, so as to establish a wireless communication connection to the target terminal device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1A:
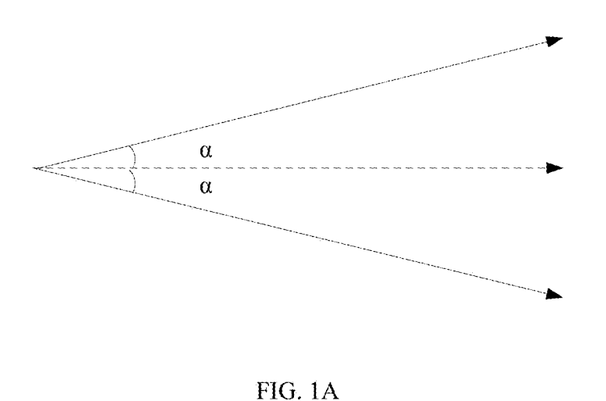
FIG. 1a is a schematic diagram of a transmission track of an ultrasonic signal.

An ultrasonic sensor is a sensor developed by using ultrasonic features. An ultrasonic wave is a mechanical wave having a higher vibration frequency higher than an acoustic wave, and has features such as a high frequency, a short wavelength, a small diffraction effect, and especially good directivity, and can be in a ray form for directional propagation. The ultrasonic wave has strong directivity. FIG. 1a shows a measurement range of an ultrasonic sensor. Referring to FIG. 1a, it may be known that a transmission track of an ultrasonic signal is a fan-shaped beam. A central line of the fan-shaped beam indicates a transmission direction of the ultrasonic signal. The ultrasonic signal is scattered around a direction that forms an included angle α with the transmission direction of the ultrasonic signal, forming a fan-shaped beam. It should be noted that α is in a value range greater than 0° and less than 90°, and a specific value of α is related to ultrasonic sensor design.

Figure 1B:
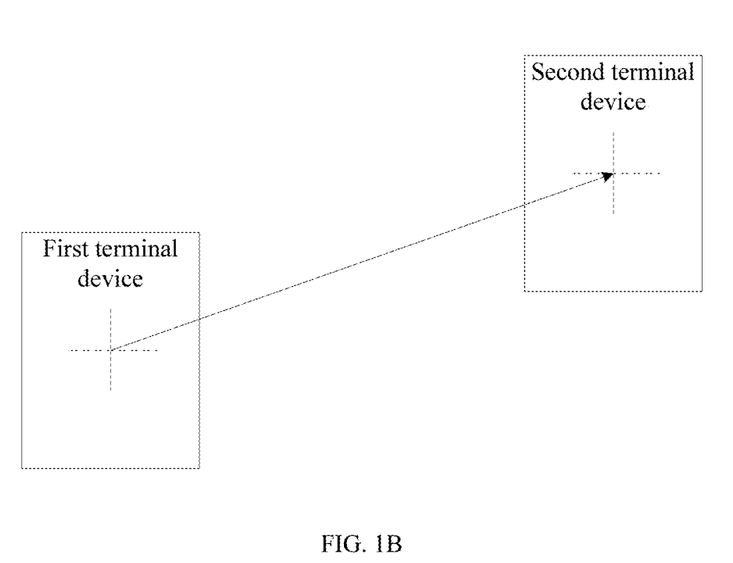
FIG. 1b is a schematic diagram of an application scenario according to an embodiment of the present disclosure.

Referring to FIG. 1b, FIG. 1b is a schematic diagram of an application scenario of a method for establishing a wireless communication connection according to an embodiment of the present disclosure. The application scenario includes a first terminal device and a second terminal device. A direction in which the second terminal device is located relative to the first terminal device is fixed. In this embodiment of the present disclosure, the first terminal device includes an ultrasonic sensor that may be configured to send an ultrasonic signal. Correspondingly, the second terminal device can receive the ultrasonic signal sent by the first terminal device.

The first terminal device may send the ultrasonic signal by using the following method: after the direction in which the second terminal device is located relative to the first terminal device is determined, entering information about the direction on the first terminal device, to trigger the ultrasonic sensor located in the first terminal device to send the ultrasonic signal to the second terminal device according to the entered direction information. Preferably, a display screen of the first terminal device is a touchscreen. The entering information about the direction on the first terminal device is implemented by means of swiping on the touchscreen. That is, after the direction in which the second terminal device is located relative to the first terminal device is determined, swiping on the touchscreen of the first terminal device is performed along the direction in which the second terminal device is located, to trigger the ultrasonic sensor in the first terminal device to transmit the ultrasonic signal along the direction in which the second terminal device is located, so that the first terminal device sends the ultrasonic signal to the second terminal device.

Further, after receiving the ultrasonic signal, the second terminal device returns a second response signal to the first terminal device for the ultrasonic signal. The second response signal carries information used to identify the second terminal device.

Figure 1C:
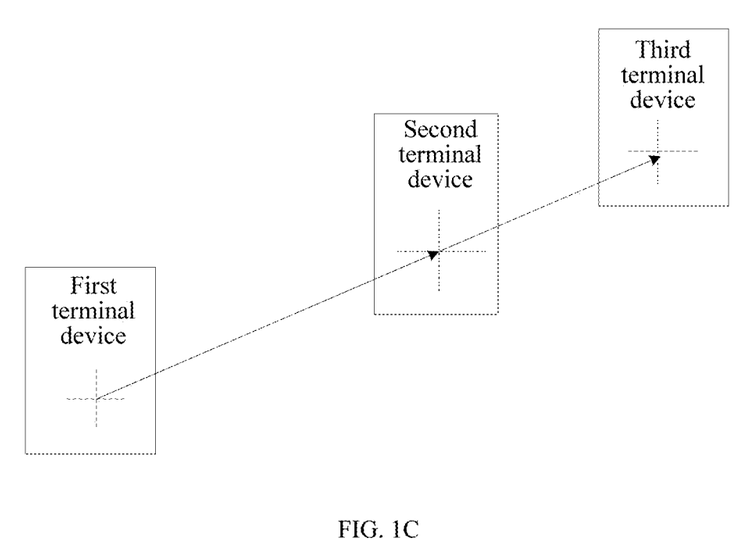
FIG. 1c is a schematic diagram of another application scenario according to an embodiment of the present disclosure.

Referring to FIG. 1c, FIG. 1c is a schematic diagram of another application scenario of a method for establishing a wireless communication connection according to an embodiment of the present disclosure. The application scenario not only includes a first terminal device and a second terminal device, but also includes a third terminal device. In addition, a direction in which the second terminal device is located relative to the first terminal device is consistent with a direction in which the third terminal device is located relative to the first terminal device. In the application scenario, when the first terminal device sends an ultrasonic signal to the second terminal device, the ultrasonic signal is also sent to the third terminal device at the same time. Correspondingly, both the second terminal device and the third terminal device feed back a response signal for the ultrasonic signal. Specifically, the second terminal device feeds back a second response signal to the first terminal device, and the second response signal carries information used to identify the second terminal device. The third terminal device feeds back a third response signal to the first terminal device, and the third response signal also carries information used to identify the third terminal device. After receiving the second response signal and the third response signal, the first terminal device determines, according to the information carried in the second response signal and the information carried in the third response signal, whether a target response signal is the second response signal or the third response signal, and establishes, according to the determined target response signal, a wireless communication connection to a terminal device that feeds back the target response signal. For example, if the first terminal device determines, according to an identity carried in the second response signal, that the second response signal is the target response signal, the second terminal device is a target terminal device, and the first terminal device establishes a wireless communication connection to the second terminal device.

Embodiment 1

Figure 3:
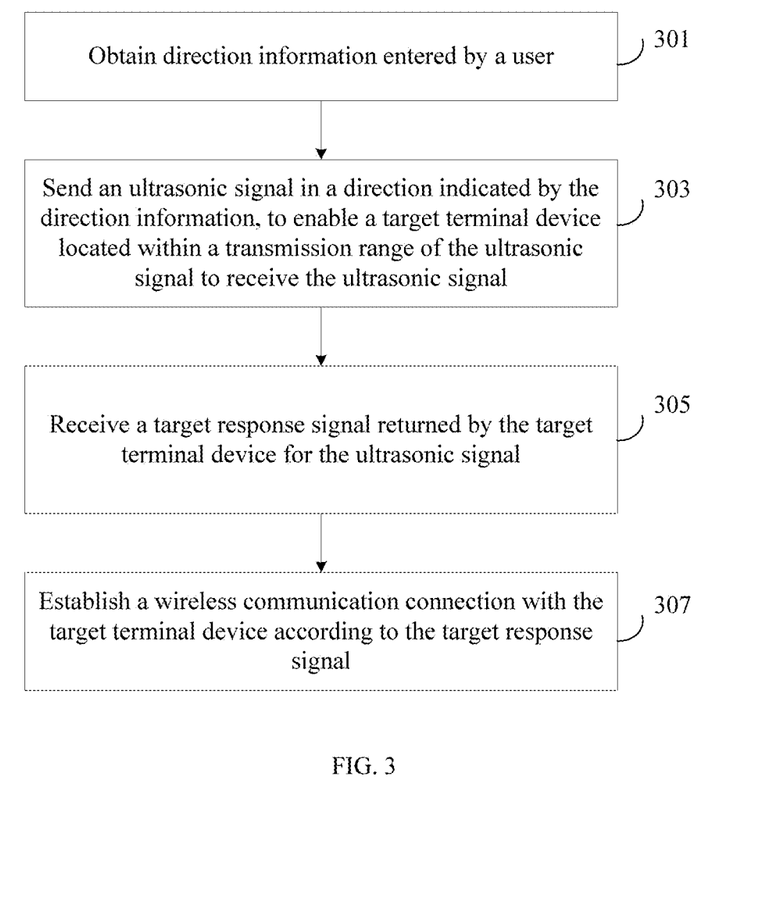
FIG. 3 is a method flowchart of a method for establishing a wireless communication connection according to an embodiment of the present disclosure.

Referring to FIG. 3a, FIG. 3a is a schematic flowchart of a method for establishing a wireless communication connection according to an embodiment of the present disclosure. The method for establishing a wireless communication connection in this embodiment may be applied to the application scenario shown in FIG. 1b or FIG. 1c. In addition, this embodiment of the present disclosure is executed by a mobile intelligent terminal, and an ultrasonic sensor is disposed inside the mobile intelligent terminal. Preferably, a display screen of the mobile intelligent terminal is a touchscreen. Specifically, the mobile intelligent terminal may be a smartphone, a tablet personal computer (PC), an iPAD, or the like.

Figure 2:
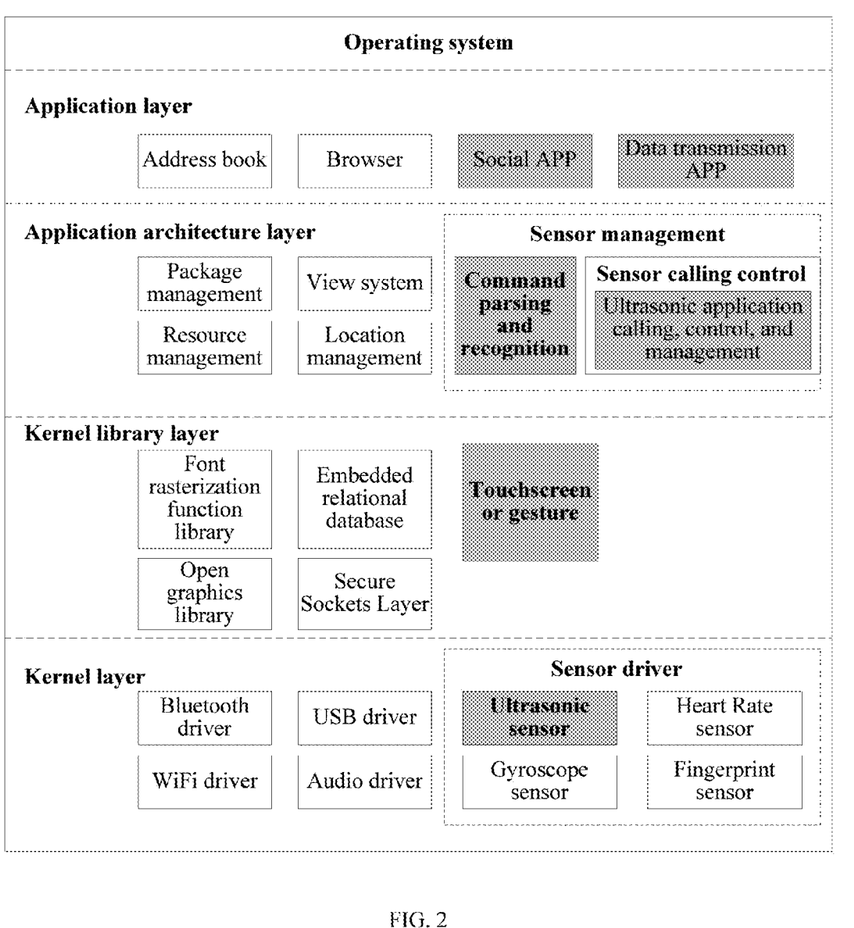
FIG. 2 is a schematic structural diagram of an operating system of a terminal device according to an embodiment of the present disclosure.

Referring to FIG. 2, FIG. 2 is a logical structure diagram of an operating system of the mobile intelligent terminal according to this embodiment of the present disclosure. The operating system includes a kernel layer, a kernel library layer, an application architecture layer, and an application layer. Features of the operating system of the mobile intelligent terminal corresponding to this embodiment of the present disclosure lie in that: the kernel layer includes various sensor drivers, such as a gyroscope sensor driver, a fingerprint sensor driver, and a heart rate sensor driver, and also includes an ultrasonic sensor driver, where the ultrasonic sensor driver is configured to drive an ultrasonic sensor. Correspondingly, a hardware structure of the mobile intelligent terminal corresponding to this embodiment of the present disclosure also includes an ultrasonic sensor that is configured to send an ultrasonic signal. Referring to FIG. 2, when the display screen of the mobile intelligent terminal is a touchscreen, the kernel library layer of the mobile intelligent terminal also includes the touchscreen or a gesture. Further, the application architecture layer of the mobile intelligent terminal includes ultrasonic sensor calling, control, management, and the like. The application layer of the mobile intelligent terminal includes a corresponding application program (APP), and during running, the APP needs to use the ultrasonic sensor to send an ultrasonic signal. The APP may be a social APP, or may be a data transmission APP.

Specifically, this embodiment of the present disclosure provides the method for establishing a wireless communication connection, where the method includes the following steps.

S301: Obtain direction information entered by a user.

S303: Send an ultrasonic signal in a direction indicated by the direction information, to enable a target terminal device located within a transmission range of the ultrasonic signal to receive the ultrasonic signal.

It should be noted that, if the mobile terminal device that executes the method in this embodiment of the present disclosure is a touchscreen, the sending an ultrasonic signal in a direction indicated by the direction information specifically includes: swiping on the touchscreen of the mobile terminal device along the direction indicated by the direction information. Correspondingly, the ultrasonic sensor located inside the mobile terminal device sends the ultrasonic signal along the swiping direction.

It should be noted that the ultrasonic signal is generally a beam as shown in FIG. 1a, that is, an angle $\alpha$ is extended towards each of two sides of the swiping direction by using the swiping direction as a central line to form a transmission track of the ultrasonic signal. $\alpha > 0°$, and a maximum value of $\alpha$ depends on a maximum offset angle of the ultrasonic sensor. Generally, the maximum offset angle of the ultrasonic sensor does not exceed 45°, and correspondingly, $0° < \alpha < 45°$.

S305: Receive a target response signal returned by the target terminal device for the ultrasonic signal.

Specifically, the target terminal device is located within the transmission range of the ultrasonic signal, and therefore, the target terminal device generally can receive the ultrasonic signal. After the target terminal device receives the ultrasonic signal, the target terminal device returns a response signal for the ultrasonic signal, where the response signal is specifically named the target response signal.

In another embodiment of the present disclosure, multiple terminal devices are located within the transmission range of the ultrasonic signal (the multiple terminal devices include the target terminal device), and in a general case, all the multiple terminal devices receive the ultrasonic signal, and return response signals respectively for the ultrasonic signal. That is, an entity for executing the present disclosure may receive multiple response signals, where the multiple response signals include the target response signal. Then, what needs to be done next is to identify the target response signal from the multiple response signals.

It should be noted that, in this embodiment of the present disclosure, the response signal includes information about a distance between a terminal device that returns the response signal and an ultrasonic signal transmit end. Therefore, the target response signal sent by the target terminal device can be identified according to different distance information carried in each response signal of the multiple response signals.

S307: Establish a wireless communication connection to the target terminal device according to the target response signal.

Specifically, the step includes at least two cases:

In a first case, the target response signal includes device information of the target terminal device. In this case, the establishing a wireless communication connection to the target terminal device according to the target response signal includes: sending a first connection establishment request to the target terminal device according to the device information of the target terminal device, receiving a first connection response returned by the target terminal device for the first connection establishment request, and establishing the wireless communication connection to the target terminal device according to the first connection response.

In a second case, the target response signal includes a second connection establishment request sent by the target terminal device to the ultrasonic signal transmit end. That is, when returning the target response signal, the target terminal device sends the second connection establishment request, where the second connection establishment request is included in the target response signal. Therefore, the establishing a wireless communication connection to the target terminal device according to the target response signal includes: sending a second connection response to the target terminal device for the second connection establishment request, to establish the wireless communication connection to the target terminal device.

Further, in still another embodiment of the present disclosure, the target response signal further includes information about a distance between the target terminal device and the ultrasonic signal transmit end. Therefore, the method provided in this embodiment of the present disclosure further includes: determining, according to the distance information about a transmission when the ultrasonic signal is transmitted to the target terminal device, a type of the wireless communication connection established with the target terminal device.

The type of the wireless communication connection includes infrared communication, near-field communication (NFC), Bluetooth, wireless local area network (WLAN), cellular network, and the like. Exemplarily, the distance between the entity for executing this solution and the target terminal device and the type of the wireless communication connection may have the following relationships: if the distance is in a range of 1 meters (m) to 10 m, the corresponding type of the wireless communication connection is infrared communication; if the distance is in a range of 10 m to 50 m, the corresponding type of the wireless communication connection is Bluetooth; if the distance is in a range of 50 m to 100 m, the corresponding type of the wireless communication connection is WLAN; and if the distance exceeds 100 m, the corresponding type of the wireless communication connection is cellular network. It should be known that a correspondence between the distance between the entity for executing this solution and the target terminal device and the type of the wireless communication connection is set manually, and the foregoing description is exemplary. The correspondence is not limited to the corresponding relationships in the foregoing example. In addition, the type of the wireless communication connection is not limited to the foregoing listed types, either, and may also include near field communication NFC and the like, which is not limited in the present disclosure.

Correspondingly, the establishing a wireless communication connection to the target terminal device according to the target response signal specifically includes: establishing the wireless communication connection to the target terminal device according to the target response signal and based on a protocol required by the type of the wireless communication connection.

It may be known that, according to the method for establishing a wireless communication connection in this embodiment of the present disclosure, an ultrasonic signal may be sent to a target terminal device as long as position information of the target terminal device is determined, so as to establish a wireless communication connection to the target terminal device. Compared with some approaches, in the technical solution provided in this embodiment of the present disclosure, no communication information of the target terminal device needs to be obtained to establish the wireless communication connection to the target terminal device. This reduces a time required for establishing the wireless communication connection and improves efficiency of establishing the wireless communication connection.

Further, the foregoing solution further provides that an appropriate communication type is selected for the wireless communication connection to the target terminal device according to information about a distance to the target terminal device. An advantage of this solution lies in that wireless communication resources are utilized appropriately.

Embodiment 2

Figure 4A:
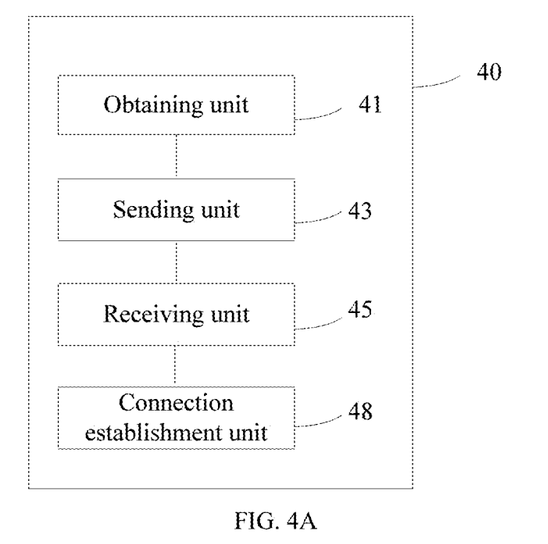
FIG. 4a is a schematic structural diagram of a terminal device according to an embodiment of the present disclosure.

Referring to FIG. 4a, FIG. 4a is a schematic structural diagram of a terminal device 40 according to an embodiment of the present disclosure. The terminal device 40 may execute the method in Embodiment 1, and may be applied to the application scenario shown in FIG. 1b and correspond to the first terminal device shown in FIG. 1b. Certainly, the terminal device 40 may also be applied to the application scenario shown in FIG. 1c, and correspond to the first terminal device shown in FIG. 1c. Specifically, an ultrasonic sensor is disposed inside the terminal device 40. Preferably, a display screen of the terminal device 40 is a touchscreen. Specifically, the terminal device 40 may be a smartphone, a tablet personal computer PC, an iPAD, or the like. A logical structure of an operating system of the terminal device 40 is shown in FIG. 2.

Specifically, the terminal device 40 includes an obtaining unit 41, a sending unit 43, a receiving unit 45, and a connection establishment unit 48.

The obtaining unit 41 is configured to obtain direction information entered by a user.

Specifically, when the display screen of the terminal device 40 is a touchscreen, the obtaining unit 41 specifically obtains, according to information about user's swiping on the display screen of the terminal device 40 or information about a user's gesture on the display screen of the terminal device 40, the direction information entered by the user.

The sending unit 43 is configured to send an ultrasonic signal in a direction indicated by the direction information, to enable a target terminal device located within a transmission range of the ultrasonic signal to receive the ultrasonic signal.

It should be noted that the sending unit 43 is specifically configured to adjust a transmission direction of the ultrasonic signal according to the direction indicated by the direction information and transmit the ultrasonic signal in the direction indicated by the direction information. The adjusting, by the sending unit 43, a transmission direction of the ultrasonic signal according to the direction indicated by the direction information refers to extending, by the sending unit 43, by an angle of $\alpha$, towards each of two sides of the direction by using the direction indicated by the direction information as a center, to form a transmission track of the ultrasonic signal, where $\alpha>0°$. It should be noted that the sending unit 43 is specifically an ultrasonic sensor, and therefore a maximum value of $\alpha$ depends on a maximum offset angle of the ultrasonic sensor. Generally, the maximum offset angle of the ultrasonic sensor does not exceed 45°, and correspondingly, $0°<\alpha<45°$.

The receiving unit 45 is configured to receive a target response signal returned by the target terminal device for the ultrasonic signal.

Specifically, the target terminal device is located within the transmission range of the ultrasonic signal, and therefore, the target terminal device generally can receive the ultrasonic signal. After the target terminal device receives the ultrasonic signal, the target terminal device returns a response signal for the ultrasonic signal, where the response signal is specifically named the target response signal.

Figure 4B:
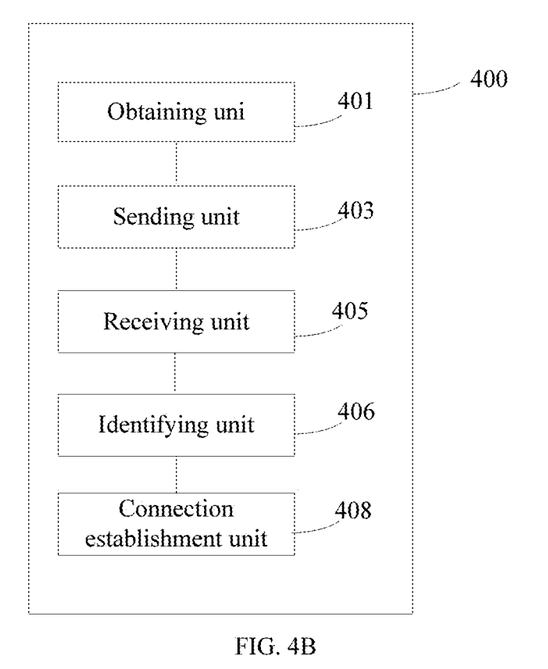
FIG. 4b is a schematic structural diagram of another terminal device according to an embodiment of the present disclosure.

In another embodiment of the present disclosure, refer to a terminal device 400 shown in FIG. 4b. A difference between the terminal device 400 and the terminal device 40 lies in that the terminal device 400 further includes an identifying unit 406.

When multiple terminal devices are located within the transmission range of the ultrasonic signal (the multiple terminal devices include the target terminal device), and in a general case, all the multiple terminal devices receive the ultrasonic signal, and return response signals respectively for the ultrasonic signal. That is, the receiving unit 405 receives multiple response signals, where the multiple response signals include the target response signal. Then, the identifying unit 406 identifies the target response signal from the multiple response signals.

It should be noted that, in this embodiment of the present disclosure, the response signal includes information about a distance between a terminal device that returns the response signal and an ultrasonic signal transmit end. Therefore, the identifying unit 406 can identify, according to different distance information carried in each response signal of the multiple response signals, the target response signal sent by the target terminal device.

The connection establishment unit 48 is configured to establish a wireless communication connection to the target terminal device according to the target response signal.

It should be noted that, in a first case, if the target response signal includes device information of the target terminal device, the connection establishment unit 48 is specifically configured to send a first connection establishment request to the target terminal device according to the device information, receive a first connection response returned by the target terminal device for the first connection establishment request, and establish the wireless communication connection to the target terminal device according to the first connection response. In a second case, if the target response signal includes a second connection establishment request sent by the target terminal device to the ultrasonic signal transmit end, the connection establishment unit 48 is specifically configured to send a second connection response to the target terminal device for the second connection establishment request, to establish the wireless communication connection to the target terminal device.

Figure 4C:
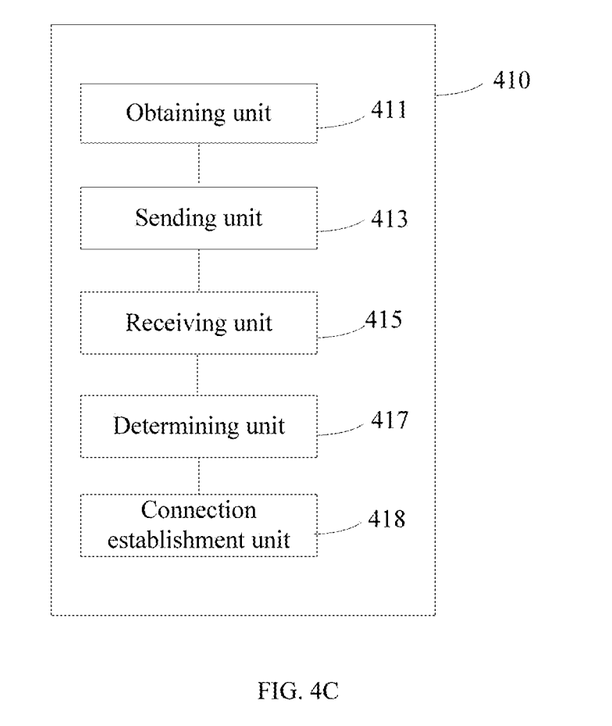
FIG. 4c is a schematic structural diagram of still another terminal device according to an embodiment of the present disclosure.

In still another embodiment of the present disclosure, refer to a terminal device 410 shown in FIG. 4c. A difference between the terminal device 410 and the terminal device 40 lies in that the terminal device 410 further includes a determining unit 417.

If the target response signal further includes information about a distance between the target terminal device and the ultrasonic signal transmit end, the determining unit 417 is configured to determine, according to the distance information about a transmission when the ultrasonic signal is transmitted to the target terminal device, a type of the wireless communication connection established with the target terminal device. Correspondingly, the connection establishment unit 418 is specifically configured to establish the wireless communication connection to the target terminal device according to the target response signal and based on a protocol required by the type of the wireless communication connection.

The type of the wireless communication connection includes infrared communication, near field communication NFC, Bluetooth, WLAN, cellular network, and the like. Exemplarily, the distance between the terminal device 410 and the target terminal device and the type of the wireless communication connection may have the following relationships: if the distance is in a range of 1 m to 10 m, the corresponding type of the wireless communication connection is infrared communication; if the distance is in a range of 10 m to 50 m, the corresponding type of the wireless communication connection is Bluetooth; if the distance is in a range of 50 m to 100 m, the corresponding type of the wireless communication connection is WLAN; and if the distance exceeds 100 m, the corresponding type of the wireless communication connection is cellular network. It should be known that a correspondence between the distance between the terminal device 410 and the target terminal device and the type of the wireless communication connection is set manually, and the foregoing description is exemplary. The correspondence is not limited to the corresponding relationships in the foregoing example. In addition, the type of the wireless communication connection is not limited to the foregoing listed types, either, and may also include near field communication NFC and the like, which is not limited in the present disclosure.

Referring to FIGS. 4a, 4b, and 4c, compared with the terminal device 40 shown in FIG. 4a, the terminal device 400 shown in FIG. 4b includes the identifying unit 406 additionally; and compared with the terminal device 40 shown in FIG. 4a, the terminal device 410 shown in FIG. 4c includes the determining unit 417 additionally. It should be understood that there may be a terminal device that not only includes all function units shown in the terminal device 40, but also includes the identifying unit in FIG. 4b and the determining unit shown in FIG. 4c. For a specific function of the identifying unit, reference may be made to the embodiment shown in FIG. 4b, and for a specific function of the determining unit, reference may be made to the embodiment shown in FIG. 4c.

It may be known that, according to the terminal device provided in this embodiment of the present disclosure, an ultrasonic signal may be sent to a target terminal device as long as position information of the target terminal device is known, so as to establish a wireless communication connection to the target terminal device. Compared with some approaches, when establishing the wireless communication connection to the target terminal device, the terminal device provided in this embodiment of the present disclosure does not need to obtain communication information of the target terminal device. This reduces a time required for establishing the wireless communication connection and improves efficiency of establishing the wireless communication connection.

Further, the present disclosure further provides that a type of wireless communication with the target terminal device is determined according to information about a distance between the terminal device and the target terminal device. An advantage of this solution lies in that wireless communication resources may be utilized appropriately.

Embodiment 3

Figure 5:
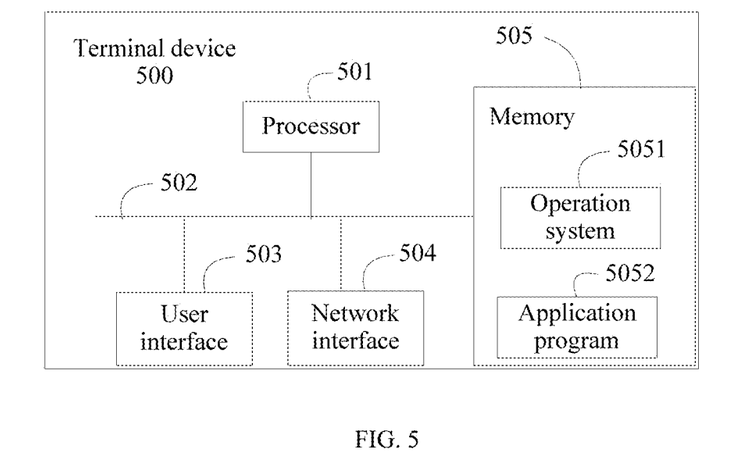
FIG. 5 is a structural block diagram of a terminal device according to an embodiment of the present disclosure.

Referring to FIG. 5, FIG. 5 is a schematic structural diagram of another terminal device 500 according to an embodiment of the present disclosure. The terminal device 500 may execute the method in Embodiment 1, and may be applied to the application scenario shown in FIG. 1b and correspond to the first terminal device shown in FIG. 1b. Certainly, the terminal device 500 may also be applied to the application scenario shown in FIG. 1b and correspond to the first terminal device shown in FIG. 1c. Specifically, an ultrasonic sensor is disposed inside the terminal device 500. Preferably, a display screen of the terminal device 500 is a touchscreen. Specifically, the terminal device 500 may be a smartphone, a tablet PC, an iPAD, or the like. A logical structure of an operating system of the terminal device 500 is shown in FIG. 2.

Specifically, as shown in FIG. 5, the terminal device 500 includes at least one processor 501, at least one network interface 504 or another user interface 503, a memory 505, and at least one communications bus 502. The communications bus 502 is configured to implement connection communication between these components. Optionally, the terminal device 500 includes the user interface 503, including a display (for example, a touchscreen, liquid crystal display (LCD), cathode ray tube (CRT), holographic imaging device or a projector), a keyboard, or a click device (for example, a mouse, a trackball, a touch board, or a touchscreen).

The memory 505 may include a read-only memory and a random access memory, and provide an instruction and data for the processor. A part of the memory 505 may include a non-volatile random-access memory (NVRAM).

In some embodiments, the memory 505 stores the following elements: an executable module or data structure, or a subset of the executable module or data structure, or an extended set of the executable module or data structure.

An operating system 5051 includes various system programs, such as a framework layer, a kernel library layer, and a driver layer, and is configured to implement various basic services and process hardware-based tasks.

An application program module 5052 includes various application programs, such as a launcher, a media player, and a browser, and is configured to implement various application services.

In this embodiment of the present disclosure, the processor 501 is configured to obtain, by calling a program or an instruction stored in the memory 505, direction information entered by a user, and send an ultrasonic signal in a direction indicated by the direction information, to enable a target terminal device located within a transmission range of the ultrasonic signal to receive the ultrasonic signal; and is configured to receive a target response signal returned by the target terminal device for the ultrasonic signal, and establish a wireless communication connection to the target terminal device according to the target response signal.

It should be noted that when the display screen of the terminal device 500 is a touchscreen, the direction information entered by the user is information about a user's swiping direction on the touchscreen or information about a user's gesture on the touchscreen.

In another embodiment of the present disclosure, the processor 501 is further configured to receive multiple response signals returned by multiple terminal devices for the ultrasonic signal, where the response signal carries distance information, and the distance information refers to information about a distance between a terminal device that returns the response signal and an ultrasonic signal transmit end; and is configured to identify, from the multiple response signals and according to multiple pieces of distance information carried in the multiple response signals, the target response signal sent by the target terminal device.

It should be noted that the processor 501 is specifically configured to adjust a transmission direction of the ultrasonic signal according to the direction indicated by the direction information and transmit the ultrasonic signal in the direction indicated by the direction information.

Further, the processor 501 is specifically configured to extend, by an angle of $\alpha$, towards each of two sides of the direction by using the direction indicated by the direction information as a center, to form a transmission track of the ultrasonic signal.

It should be noted that the ultrasonic sensor sends the ultrasonic signal. Therefore, a value of $\alpha$ is in a range of 0 to a maximum offset angle of the ultrasonic sensor. Generally, the maximum offset angle of the ultrasonic sensor does not exceed 45°, and correspondingly, $0°<\alpha<45°$.

In still another embodiment of the present disclosure, if the target response signal includes device information of the target terminal device, the processor 501 is specifically configured to send a first connection establishment request to the target terminal device according to the device information, receive a first connection response returned by the target terminal device for the first connection establishment request, and establish the wireless communication connection to the target terminal device according to the first connection response.

In still another embodiment of the present disclosure, if the target response signal includes a second connection establishment request sent by the target terminal device to the ultrasonic signal transmit end, the processor 501 is specifically configured to send a second connection response to the target terminal device for the second connection establishment request, to establish the wireless communication connection to the target terminal device.

Further, if the target response signal further includes information about a distance between the target terminal device and the ultrasonic signal transmit end, the processor 501 is specifically configured to determine, according to the distance information about a transmission when the ultrasonic signal is transmitted to the target terminal device, a type of the wireless communication connection established with the target terminal device. The type of the wireless communication connection includes infrared communication, near field communication NFC, Bluetooth, WLAN, cellular network, and the like. Exemplarily, the distance between the terminal device 500 and the target terminal device and the type of the wireless communication connection may have the following relationships: if the distance is in a range of 1 m to 10 m, the corresponding type of the wireless communication connection is infrared communication; if the distance is in a range of 10 m to 50 m, the corresponding type of the wireless communication connection is Bluetooth; if the distance is in a range of 50 m to 100 m, the corresponding type of the wireless communication connection is WLAN; and if the distance exceeds 100 m, the corresponding type of the wireless communication connection is cellular network. It should be known that a correspondence between the distance between the terminal device 410 and the target terminal device and the type of the wireless communication connection is set manually, and the foregoing description is exemplary. The correspondence is not limited to the corresponding relationships in the foregoing example. In addition, the type of the wireless communication connection is not limited to the foregoing listed types, either, and may also include near field communication NFC and the like, which is not limited in the present disclosure.

It may be known that, according to the terminal device provided in this embodiment of the present disclosure, an ultrasonic signal may be sent to a target terminal device as long as position information of the target terminal device is known, so as to establish a wireless communication connection to the target terminal device. Compared with some approaches, when establishing the wireless communication connection to the target terminal device, the terminal device provided in this embodiment of the present disclosure does not need to obtain communication information of the target terminal device. This reduces a time required for establishing the wireless communication connection and improves efficiency of establishing the wireless communication connection.

Further, the present disclosure further provides that a type of wireless communication with the target terminal device is determined according to information about a distance between the terminal device and the target terminal device. An advantage of this solution lies in that wireless communication resources may be utilized appropriately.

Mutual reference may be made among the foregoing embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for establishing a wireless communication connection, the method comprising:
   obtaining, by a first terminal device, direction information entered by a user;
   transmitting, from the first terminal device, an ultrasonic signal in a direction indicated by the direction information;
   receiving, by the first terminal device, a target response signal from a target terminal device in response to the ultrasonic signal, wherein the target response signal comprises distance information indicating a distance between the target terminal device and the first terminal device;
   selecting a type of wireless communication connection based on the distance information; and
   establishing the wireless communication connection between the first terminal device and the target terminal device according to the target response signal and based on a protocol required by the type of wireless communication connection.

2. The method of claim 1, wherein the target terminal device is a first target terminal device, wherein the target response signal is a first target response signal, and wherein receiving the target response signal comprises:
   receiving a plurality of target response signals from a corresponding plurality of terminal devices in response to the ultrasonic signal, wherein the plurality of terminal devices includes the first target terminal device, and each target response signal comprises distance information corresponding to a distance between the associated terminal device and the first terminal device; and
   identifying, from the plurality of target response signals and according to the distance information, the fit target response signal, and
   wherein establishing the wireless communication connection comprises establishing the wireless communication connection between the first terminal device and the first target terminal device according to the first target response signal.

3. The method of claim 2, wherein the method further comprises determining a type of wireless communication connection based on the distance information received in the first target response signal, and wherein establishing the wireless communication connection comprises establishing the wireless communication connection between the first terminal device and the target terminal device according to the first target response signal distance information and based on a protocol required by the type of wireless communication connection.

4. The method of claim 2, wherein the first target response signal comprises device information of the first target terminal device, and wherein establishing the wireless communication connection comprises:
   transmitting a first connection establishment request from the first terminal device to the first target terminal device according to the device information;
   receiving at the first terminal device a first connection response from the first target terminal device in response to the first connection establishment request; and
   establishing the wireless communication connection between the first terminal device and the first target terminal device according to the first connection response.

5. The method of claim 2, wherein the first target response signal comprises a second connection establishment request, and wherein establishing the wireless communication connection comprises:
   transmitting a second connection response from the first terminal device to the first target terminal device; and
   establishing the wireless communication connection between the first terminal device and the first target terminal device according to the second connection response.

6. The method of claim 1, wherein transmitting the ultrasonic signal comprises adjusting a transmission direction of the ultrasonic signal according to the direction information.

7. The method of claim 6, wherein adjusting the transmission direction comprises: forming a transmission track of the ultrasonic signal by extending, by an angle α, towards each of two sides of the direction, and using the direction as a central axis.

8. The method of claim 1, wherein the target response signal comprises device information of the target terminal device, and wherein establishing the wireless communication connection comprises:
transmitting a first connection establishment request from the first terminal device to the target terminal device according to the device information;
receiving at the first terminal device a first connection response from the target terminal device in response to the first connection establishment request; and
establishing the wireless communication connection between the first terminal device and the target terminal device according to the first connection response.

9. The method of claim 1, wherein the target response signal comprises a second connection establishment request, and wherein establishing the wireless communication connection comprises:
transmitting a second connection response from the first terminal device to the target terminal device; and
establishing the wireless communication connection between the first terminal device and the target terminal device according to the second connection response.

10. An initiating terminal device comprising:
a memory; and
a processor coupled to the memory and configured to:
obtain direction information entered by a user;
transmit an ultrasonic signal in a direction indicated by the direction information;
receive a target response signal from a target terminal device in response to the ultrasonic signal, wherein the target response signal comprises distance information indicating a distance between the target terminal device and the first terminal device;
determine a type of wireless communication connection based on the distance information; and
establish a wireless communication connection with the target terminal device according to the target response signal and based on a protocol required by the type of wireless communication connection.

11. The initiating terminal device of claim 10, wherein the target terminal device is a first target terminal device, wherein the target response signal is a first target response signal, and wherein the processor is further configured to:
receive a plurality of response signals from a corresponding plurality of terminal devices in response to the ultrasonic signal, wherein the plurality of terminal devices comprises the target terminal device, wherein each target response signal comprises distance information corresponding to a distance between the associated terminal device and the initiating terminal device;
identify, from the plurality of target response signals and according to the distance information, the first target response signal; and
establish the wireless communication connection between the first terminal device and the first target terminal device according to the first target response signal.

12. The initiating terminal device of claim 11, wherein the processor is configured to:
determine a type of wireless communication connection based on the distance information received in the first target response signal; and
establish the wireless communication connection according to the first target response signal distance information and based on a protocol required by the type of wireless communication connection.

13. The initiating terminal device of claim 11, wherein the first target response signal comprises device information of the first target terminal device, and wherein the processor is further configured to:
transmit a first connection establishment request to the first target terminal device according to the device information;
receive a first connection response from the first target terminal device in response to the first connection establishment request; and
establish the wireless communication connection with the first target terminal device according to the first connection response.

14. The initiating terminal device of claim 11, wherein the first target response signal comprises a second connection establishment request, and wherein the processor is further configured to:
transmit a second connection response to the first target terminal device; and
establish the wireless communication connection with the first target terminal device according to the second connection response.

15. The initiating terminal device of claim 10, wherein the processor is further configured to adjust a transmission direction of the ultrasonic signal according to the direction information.

16. The initiating terminal device of claim 10, wherein the processor is further configured to form a transmission track of the ultrasonic signal by extending, by an angle α, towards each of two sides of the direction, and using the direction as a central axis.

17. The initiating terminal device of claim 10, wherein the target response signal comprises device information of the target terminal device, and wherein the processor is further configured to:
transmit a first connection establishment request to the target terminal device according to the device information;
receive a first connection response from the target terminal device in response to the first connection establishment request; and
establish the wireless communication connection with the target terminal device according to the first connection response.

18. The initiating terminal device of claim 10, wherein the target response signal comprises a second connection establishment request, and wherein the processor is further configured to:
transmit a second connection response to the target terminal device; and
establish the wireless communication connection with the target terminal device according to the second connection response.

* * * * *

UNITED STATES PATENT AND TRADEMARK OFFICE
CERTIFICATE OF CORRECTION

PATENT NO. : 9,955,517 B2
APPLICATION NO. : 15/399861
DATED : April 24, 2018
INVENTOR(S) : Mingjie Dong Page 1 of 1

It is certified that error appears in the above-identified patent and that said Letters Patent is hereby corrected as shown below:

In the Claims

Column 16; Line 24; Claim 2 should read:
and according to the distance information, the first target Signed and Sealed this
Fifth Day of June, 2018

Andrei Iancu
*Director of the United States Patent and Trademark Office*